United States Patent [19]

Roe et al.

[11] Patent Number: 4,875,148
[45] Date of Patent: Oct. 17, 1989

[54] CONTROL FOR PRODUCING A LOW MAGNITUDE VOLTAGE AT THE OUTPUT OF A PWM INVERTER

[75] Inventors: Derrick I. Roe, Rockford, Ill.; Christopher J. Rozman, Delavan, Wis.; Bradley J. Recker, Rockford, Ill.

[73] Assignee: Sundstrand Corporation, Rockville, Ill.

[21] Appl. No.: 285,117

[22] Filed: Dec. 16, 1988

[51] Int. Cl.⁴ .............................................. H02M 1/44
[52] U.S. Cl. ........................................ 363/41; 363/42; 363/98; 363/56; 363/132
[58] Field of Search ............................. 363/37, 41–42, 363/56, 98, 131, 132, 159–161, 163

[56] References Cited

U.S. PATENT DOCUMENTS

| | | | |
|---|---|---|---|
| 4,245,290 | 1/1981 | Lipman | 363/41 |
| 4,318,167 | 3/1982 | Ängquist | 363/41 |
| 4,364,109 | 12/1982 | Okado et al. | 363/41 |
| 4,533,836 | 8/1985 | Carpenter et al. | 363/49 |
| 4,559,593 | 12/1985 | Glennon | 363/41 |
| 4,617,675 | 10/1986 | Ashikaga et al. | 363/41 |

Primary Examiner—Peter S. Wong
Attorney, Agent, or Firm—Marshall, O'Toole, Gerstein, Murray & Bicknell

[57] ABSTRACT

At times, it may be necessary to operate switches of a PWM inverter to provide a low output voltage. However, in order to produce such a low voltage, it may be necessary to operate the switches near their minimum on time limit, which can in turn lead to damage or destruction of the switches. In order to overcome this problem, a control for an inverter which produces an output voltage having two levels wherein the inverter includes first and second switches coupled to an inverter output produces first and second switch control signals each having alternating switch on and switch off portions wherein each switch on portion is of a duration in excess of the minimum on time limit of the switches. The first and second switches are operated in accordance with the first and second switch control signals, respectively, to produce the output voltage wherein the switches are operated in a particular switch state for a duration less than the minimum on time limit of the switches to cause the output voltage to assume one of the levels during such time. Inasmuch as the switches are operated for periods of time in excess of the minimum on time limit, the risk of damage to or destruction of the switches is minimized.

9 Claims, 4 Drawing Sheets

CONTROL FOR PRODUCING A LOW MAGNITUDE VOLTAGE AT THE OUTPUT OF A PWM INVERTER

TECHNICAL FIELD

The present invention relates generally to inverter controls, and more particularly to a control which operates an inverter to produce a low magnitude voltage across a load without damaging switches used in the inverter.

BACKGROUND ART

Static inverters are often used to provide variable voltage and variable frequency power to a load, such as a motor. Such an inverter may be of the polyphase type having three sets of switches which are operated to produce a three-phase output. The inverter switches are typically controlled in a pulse width modulated (PWM) mode of operation wherein the output voltage developed by the inverter is controlled by varying the length of time the inverter switches are turned on. When energizing such a load, it may be necessary to provide a very low magnitude of inverter output voltage. This, in turn, can only be provided in a PWM mode of operation by turning the switches on for short periods of time. However, as is generally known, conventional power switches of the bipolar transistor type cannot be turned on for less than a minimum on time without damage thereto. Thus, the inverter cannot supply less than a particular magnitude of output voltage without running a substantial risk of inverter switch failure.

One example of where this problem arises is when an inverter is controlled to operate a starter/generator as a motor to supply motive starting power to a prime mover. Such components may comprise part of a variable speed, constant frequency (VSCF) generating system used, for example, in an aircraft.

Patents disclosing PWM controls for an inverter include U.S. Pat. Nos. 4,318,167, to Angquist, 4,533,836, to Carpenter et al., 4,364,109 to Okado et al. and 4,559,593, to Glennon, assigned to the assignee of the instant application. None of these patents, however, addresses the problem of operating switches in a PWM inverter to produce a low voltage output without risking damage to or destruction of the switches.

SUMMARY OF THE INVENTION

In accordance with the present invention, an inverter control operates switches in an inverter to produce a low voltage output without substantially increasing the risk of damage to or destruction of the switches.

Broadly, the control operates an inverter to produce an output voltage having two levels wherein the inverter includes first and second switches coupled to an inverter output and wherein the switches are operable in a first switch state during which both switches are on or both switches are off and in a second switch state during which one switch is on and the other is off. The control produces first and second switch control signals each having alternating switch on and switch off portions wherein each switch on portion is of a duration in excess of the minimum on time limit of the switches. The first and second switches are operated in accordance with the first and second switch control signals, respectively, to produce the output voltage wherein the switches are operated in one of the switch states for a duration less than the minimum on time limit of a switch to cause the output voltage to assume one of the levels during such time.

In a preferred embodiment, the control operates the inverter to develop first and second phase voltages across a load wherein each phase voltage comprises alternating first and second half cycles. The control produces a modulation waveform, a 50% duty cycle waveform and first and second half cycle waveforms wherein the modulation waveform comprises a series of pulses defined by alternating rising and falling edges and wherein the 50% duty cycle waveform comprises alternating pulses and notches of substantially equal duration defined by rising and falling edges each synchronized with a rising edge of the modulation waveform. The half cycle waveforms indicate when the phase voltages are in the first or second half cycles. The 50% duty cycle is combined with the modulation waveform and the half cycle waveforms to derive first and second switch control signals associated with the first and second phase voltages, respectively. Each switch control signal comprises a series of pulses wherein each pulse begins at the rising edge of a pulse of a modulation waveform and ends at the falling edge of the next pulse in the modulation waveform when the associated phase voltage is in the first half cycle. Alternatively, when the associated phase voltage is in the second half cycle, each pulse of the switch control waveform begins at the falling edge of a pulse of the modulation waveform and ends at the rising edge of the next pulse in the modulation waveform. The resulting first and second switch control signals are used to operate first and second switches of the inverter to produce the first and second phase voltages.

In the preferred embodiment, the switching sequence effected by the control of the present invention results in the generation of narrow pulses across the load, wherein the widths of the pulses are determined by the width of the pulses in the modulation waveform. Significantly, however, the switches are operated near 50% duty cycle so that the switches are turned on for periods well in excess of the minimum on time. Thus, the risk of damage to or destruction of the switches is minimized.

The control of the present invention is implemented in a simple fashion with a small number of logic components and hence is inexpensive and reliable in operation.

DESCRIPTION OF THE PREFERRED EMBODIMENT

Figure 1:
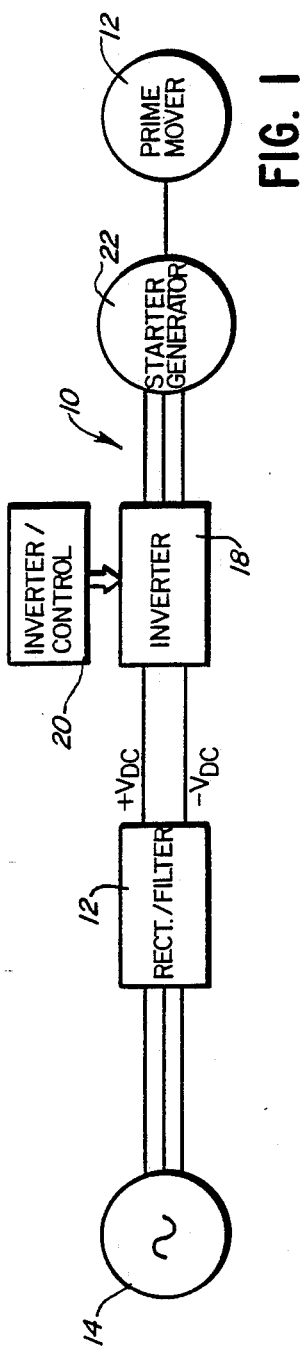
FIG. 1 comprises a simplified block diagram of a starting system in conjunction with a prime mover.

Referring now to FIG. 1, there is illustrated a starting system 10 which is operable to provide motive starting power to a prime mover 12 which may be, for example, an aircraft jet engine. The starting system 10 includes a rectifier/filter 12 which receives AC power provided by an AC source 14. The rectifier/filter 12 develops DC power comprising positive and negative DC voltages $+V_{DC}$ and $-V_{DC}$ which are provided to a static inverter 18 having switches operated by an inverter control 20. The inverter 18 is operated by the inverter control 20 to provide variable voltage, variable frequency power to a brushless, synchronous generator 22 such that the generator 22 is operated as a motor to develop the motive starting power.

It should be noted that the rectifier/filter 12, the inverter 18, the inverter control 20 and the generator 22 may be components of a variable speed, constant frequency (VSCF) aircraft power system operable in a generating mode to convert variable speed motive power produced by the prime mover 12 into constant frequency AC power for one or more loads (not shown).

Figure 2:
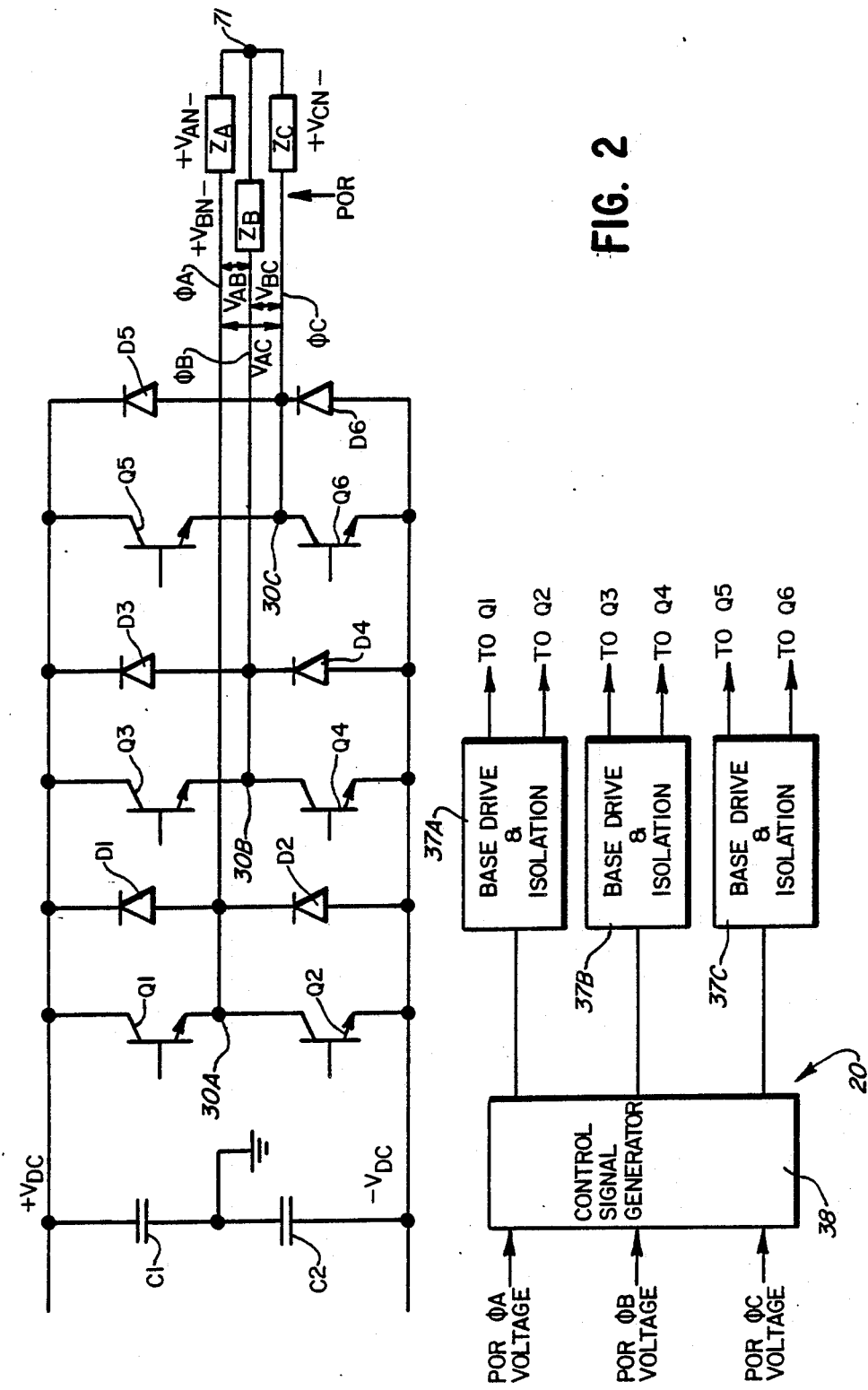
FIG. 2 comprises a combined block and simplified schematic diagram of the inverter and inverter control shown in FIG. 1.

Referring now to FIG. 2, there is illustrated in greater detail the inverter 18 and the inverter control 20 in conjunction with three phase impedances $Z_A$, $Z_B$ and $Z_C$ representing the impedances of the windings of the generator 22. The inverter 18 includes three sets of power switches in the form of bipolar transistors Q1–Q6 and associated flyback diodes D1–D6 connected in a conventional bridge configuration. The inverter 18 further includes first and second capacitors C1 and C2 which are coupled across the DC link. The junction between the capacitors C1 and C2 is coupled to ground potential.

Phase output voltages are developed at phase output terminals 30A, 30B, 30C and are provided to the windings of the generator 22. If desired, a filter may be connected between the phase outputs 30A–30C and the generator 22.

It should be noted that the rail to rail topology illustrated in FIG. 2 may be replaced by a rail to neutral topology (also referred to as a "neutral point clamped" topology) in which bidirectional switches are coupled between the phase outputs terminals 30A–30C and ground potential. The inverter may instead be of a different topology, if desired.

It should also be noted that the inverter 18 may be operated to supply power to a load other than a generator, if desired.

The inverter control 20 includes base drive and isolation circuits 37A–37C which provide base drive signals to the switches Q1–Q6. The base drive and isolation circuits 37A–37C receive switch control signals developed by a control signal generator 38 which is responsive to one or more output parameters of the inverter 18. For example, the control signal generator 38 may be responsive to phase voltages developed at a point of regulation (POR) near the load and/or may be responsive to additional output parameters, as desired.

The switches of each of the three sets of switches Q1–Q6 are alternately operated to produce positive and negative half cycle outputs at the phase outputs terminals 30A–30C. The half cycle outputs of the phases are angularly displaced with respect to one another by 120°, as is conventional. The voltage across each impedance $Z_A$–$Z_C$ is determined by the open/closed status of the switches in the inverter 18. More specifically, the following phase output to neutral voltages $V_{AN}$, $V_{BN}$ and $V_{CN}$ are developed in response to the following switch states:

| SWITCH STATE | Q1/Q2 | Q3/Q4 | Q5/Q6 | $V_{AN}$ | $V_{BN}$ | $V_{CN}$ |
|---|---|---|---|---|---|---|
| 0 | Off/On | Off/On | Off/On | 0 | 0 | 0 |
| 1 | Off/On | Off/On | On/Off | $-2/3V_{DC}$ | $-2/3V_{DC}$ | $+4/3V_{DC}$ |
| 2 | Off/On | On/Off | Off/On | $-2/3V_{DC}$ | $+4/3V_{DC}$ | $-2/3V_{DC}$ |
| 3 | Off/On | On/Off | On/Off | $-4/3V_{DC}$ | $+2/3V_{DC}$ | $+2/3V_{DC}$ |
| 4 | On/Off | Off/On | Off/On | $+4/3V_{DC}$ | $-2/3V_{DC}$ | $-2/3V_{DC}$ |
| 5 | On/Off | Off/On | On/Off | $+2/3V_{DC}$ | $-4/3V_{DC}$ | $+2/3V_{DC}$ |
| 6 | On/Off | On/Off | Off/On | $+2/3V_{DC}$ | $+2/3V_{DC}$ | $-4/3V_{DC}$ |
| 7 | On/Off | On/Off | On/Off | 0 | 0 | 0 |

Where $V_{DC}$ is the voltage on one of the DC link conductors relative to ground, as noted previously.

Figure 3:
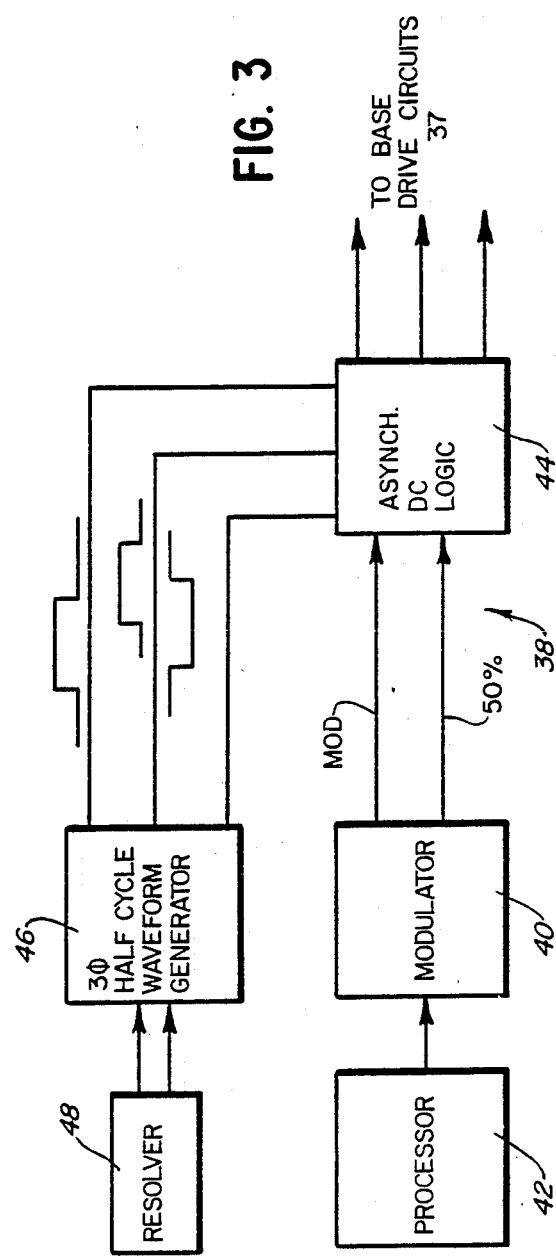
FIG. 3 comprises a simplified block diagram of the control signal generator illustrated in FIG. 2.

Referring now to FIG. 3, there is illustrated in block diagram form a portion of the control signal generator 38. The control signal generator 38 includes a modulator 40 which is responsive to a modulation index signal developed by a processor 42. The processor 42, which may be a commercially available microprocessor, develops the modulation index signal in accordance with a schedule which is predetermined to result in acceleration of the generator 22 in a controlled fashion. The modulator 40 in turn develops a modulation signal MOD and a 50% duty cycle signal which are in turn provided to low duty cycle logic circuitry 44. The logic circuitry 44 further receives three-phase half cycle reference waveforms developed by a waveform generator 46 which is in turn responsive to the output of a resolver 48. The resolver 48 develops a signal representing the position of a rotor of the generator 22.

The half cycle reference generator 46 develops three half cycle waveforms indicating when the phase voltages are in the positive or negative half cycles. For example, the half cycle waveform for phase A is in a first or high state when the phase output appearing at the terminal 30A is in the positive half cycle and is in a second or low state when the phase output at the terminal 30A is in the negative half cycle. As should be evident from the foregoing, the three half cycle waveforms are phase displaced by 120° relative to one another.

The low duty cycle logic circuit 44 combines the 50% duty cycle waveform with the modulation waveform and the half cycle waveforms to derive first, second and third switch control signals associated with first, second and third phase voltages and provides same to the base drive and isolation circuits 37. Each switch control signal includes switch on and switch off portions whose widths are determined in accordance with the modulation index signal. Significantly, when the modulation index signal provided by the processor 42 is such that a low voltage is to be delivered to the generator 22, the low duty cycle logic 44 operates the switches Q1–Q6 near 50% duty cycle so that a low magnitude voltage is developed by the inverter 18, as desired.

Figure 4:
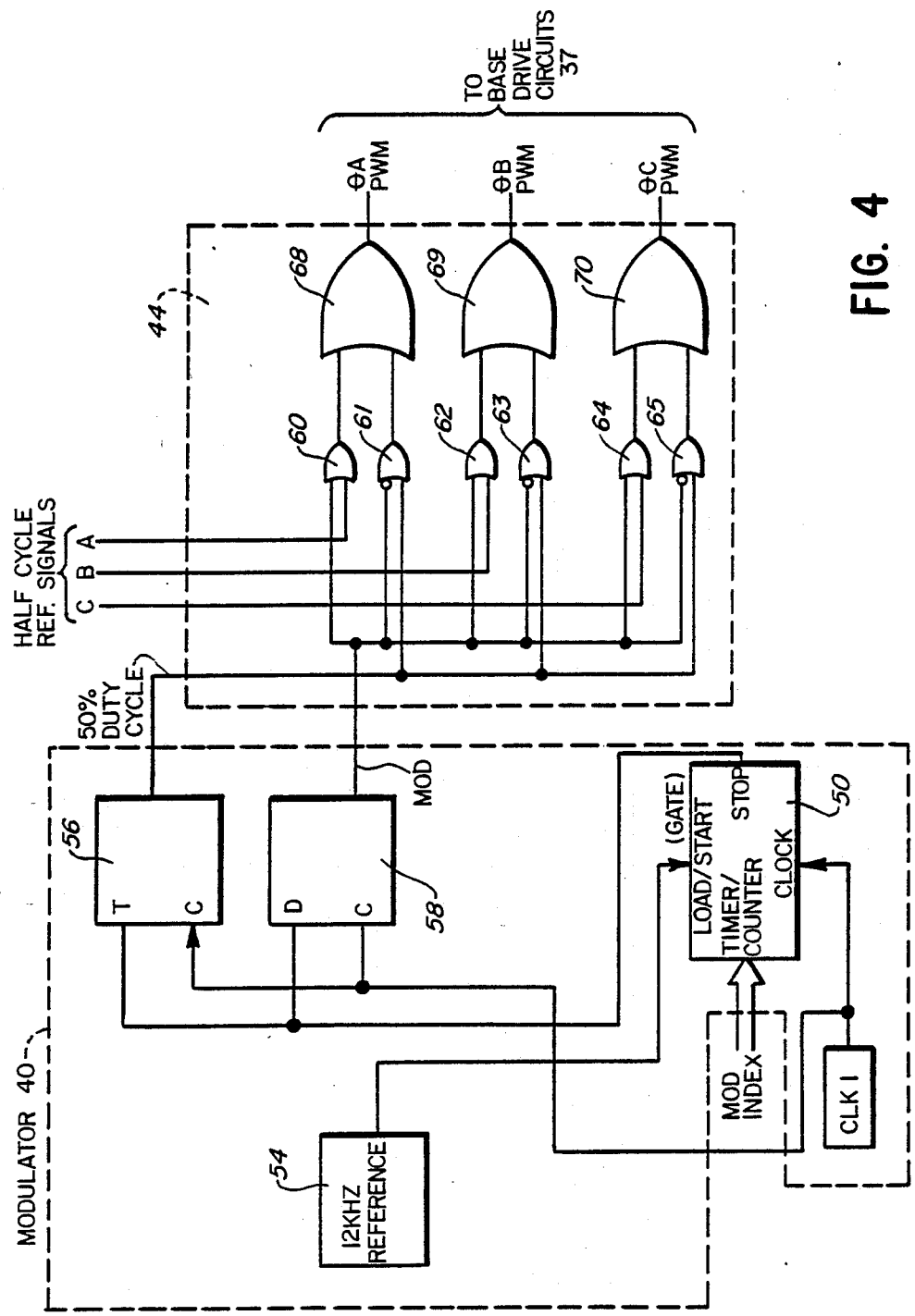
FIG. 4 comprises a combined block and logic diagram of the low duty cycle logic circuit illustrated in block diagram form in FIG. 3.

Referring now to FIG. 4, there is illustrated in greater detail the modulator 40 and low duty cycle logic circuitry 44. The modulator 40 includes a timer/ counter 50 which receives the modulation index signal in the form of a digital word from the processor 42. The timer/counter 50 includes a register into which the processor 42 loads the digital word. When a rising edge of a waveform developed by a 12 khz reference signal generator 54 is received by the timer/counter 50, the digital word stored in the register is loaded into the counter. At this time, the output of the timer/counter 50 is switched to a high state and the word loaded into the timer/counter 50 is decremented in accordance with pulses received from a clock CLK1 until such value is decremented to zero. At this time, the output of the timer/counter switches to a low state. Inasmuch as the signal received from the generator 54 has a fixed period, the output of the timer/counter is likewise a signal having a fixed period, and hence the modulation index signal determines the duty cycle of the output of the timer/counter 50. Of course, the reference generator 54 may operate at a different frequency, if desired.

The output of the timer/counter 50 is provided to a T flip-flop 56 and to a D flip-flop 58. Both flip-flops are clocked by the signal developed by the clock CLK1. As seen in the waveform diagram of FIG. 5 the T flip-flop 56 develops the 50% duty cycle and the D flip-flop 58 develops the modulation signal MOD in such a way that each rising and falling edge of the 50% duty cycle i substantially coincident with a rising edge of the signal MOD. These signals, together with the half cycle reference signals developed by the reference generator 46 are provided to the low duty cycle logic circuitry 44.

The logic circuitry 44 includes a series of AND gates 60–65 which receive the 50% duty cycle waveform, the modulation waveform MOD and the half cycle reference signals and develop outputs which are coupled to inputs of OR gates 68–70. The gates 68–70 in turn develop the first through third switch control signals. More specifically, the AND gates 60, 62 and 64 receive the three half cycle signals associated with phases A, B and C, respectively, and the signal MOD in noninverted form. The AND gates 61, 63 and 65 receive the 50% duty cycle waveform and the signal MOD in inverted form.

The outputs of the AND gates 60 and 61 are provided to inputs of the OR gate 68. In like fashion, the outputs of the AND gates 62 and 63 are provided to inputs of the OR gates 69 and the outputs of the AND gates 64 and 65 are provided to inputs of the OR gate 70.

Figure 5:
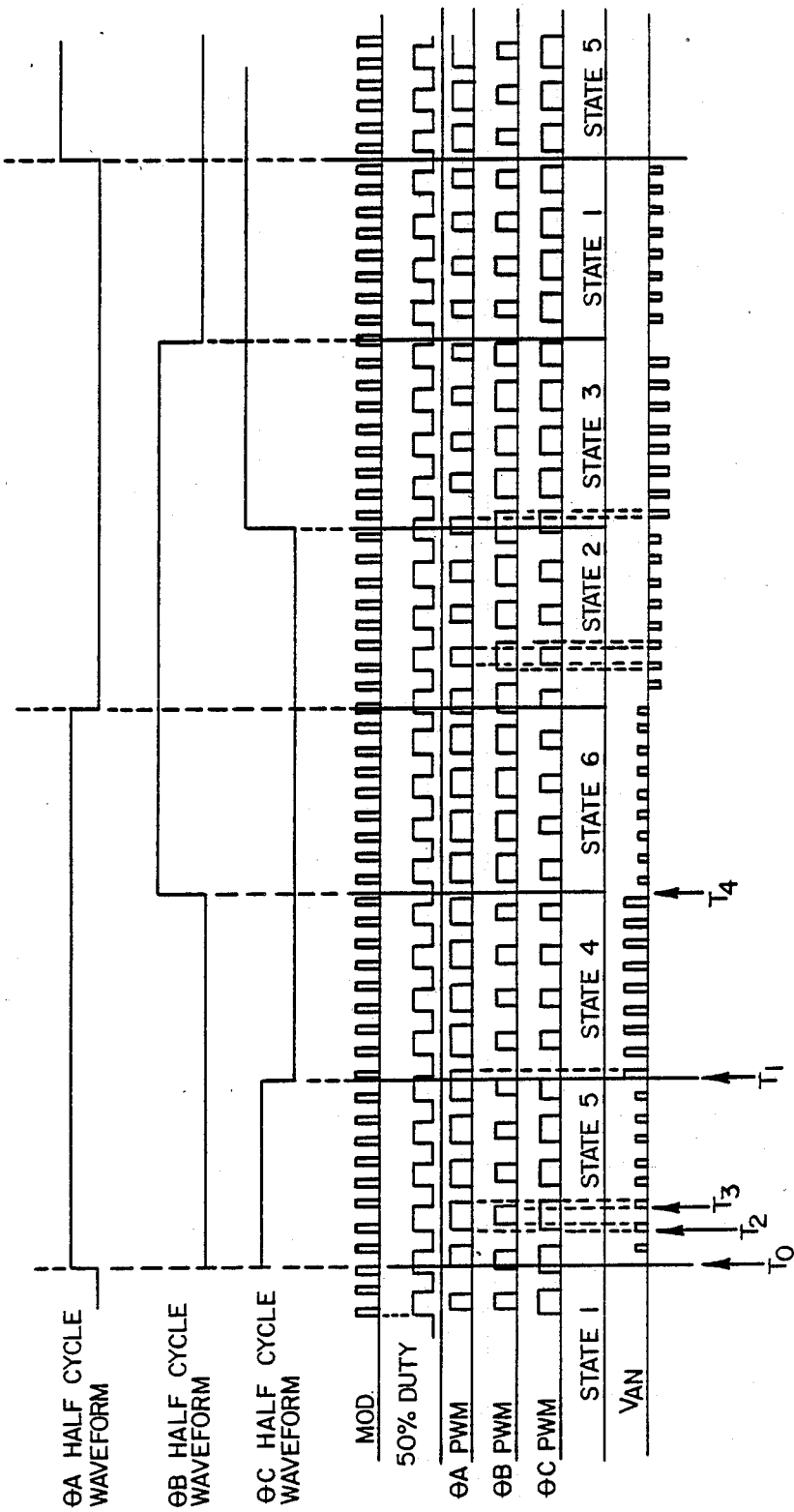
FIG. 5 comprises a series of waveform diagrams illustrating the operation of the control of the present invention.

Referring now to the waveform diagrams of FIG. 5, it can be seen that the modulation waveform MOD comprises a series of pulses at a fixed frequency The widths of these pulses, i.e. the duty cycle of this waveform, determines the width of pulses produced at each phase output terminal 30A–30C relative to a neutral voltage produced at a common load terminal 71, FIG. 2.

Assume that a time $T=T_0$, the phase A half cycle waveform switches from a low to a high state, thereby indicating that the phase A output is in the positive half cycle, and that the remaining phase outputs i.e. phases B and C, are in the negative and positive half cycle portions, respectively. Further assume that these conditions continue to exist until a subsequent time $T_1$, at which time the phase C output voltage switches from the positive half cycle to the negative half cycle. Between the times $T_0$ and $T_1$, the waveforms developed by the OR gates 68 and 70 include a series of pulses which are defined by rising edges which are substantially coincident with a rising edge of a pulse in the modulation waveform and falling edges which are substantially coincident with a falling edge of the next pulse in the modulation waveform. The waveform developed by the OR gate 69, however, comprises a series of pulses having rising edges substantially coincident with a falling edge of a pulse in the modulation waveform and a falling edge substantially coincident with a rising edge of the next pulse in the modulation waveform This switching pattern results in the generation of narrow pulses, for example at times $T_2$ and $T_3$, in the phase outputs (only the phase output $V_{AN}$ is shown for purposes of clarity). The pulses in the phase outputs are at a level equal to $+2/3\ V_{DC}$, consistent with the output voltage set forth above in the table in connection with switch state 5.

In subsequent 60° portions of the illustrated $V_{AN}$ output, one of the half cycle waveforms changes state, thereby causing the OR gates 68–70 to produce different switch control signals. For example, between the times $T_1$ and $T_4$, the waveforms developed by the OR gates 69 and 70 are at less than 50% duty cycle while the waveform developed by the OR gate 68 is at greater than 50% duty cycle. The width of each pulse developed by each OR gate 68–70 differs from the width of the pulses produced in the 50% duty cycle by the width of a modulation pulse.

The switching sequence is controlled in accordance with the switch states indicated in the waveform diagrams of FIG. 5. A low output voltage is thereby produced without operating the switches near the minimum on time limit.

It should be noted that the present invention can be adapted to inverters having other than three phases and may be used in inverters which do not utilize positive and negative polarity input DC voltages, if desired.

We claim:

1. A method of operating an inverter to produce an output voltage having two levels wherein the inverter includes first and second switches coupled to an inverter output, the switches being operable in a first switch state during which both switches are on or both switches are off and in a second switch state during which one switch is on and the other is off and wherein each switch has a minimum on time limit, comprising the steps of:

producing first and second switch control signals each having alternating switch on and switch off portions wherein each switch on portion is of a duration in excess of the minimum on time limit of a switch; and operating the first and second switches in accordance with the first and second switch control signals, respectively, to produce the output voltage wherein the switches are operated in one of the switch states for a duration less than the minimum on time limit of a switch to cause the output voltage to assume one of the levels during such time.

2. A method of operating an inverter to produce first and second voltages across a load wherein each voltage comprises alternating first and second half-cycles and wherein the half-cycles of the first phase voltage are angularly displaced relative to the half-cycles of the second phase voltage, comprising the steps of:

(a.) producing a modulation waveform comprising a series of pulses defined by alternating rising and falling edges;

(b.) producing a 50% duty cycle waveform comprising alternating pulses and notches of substantially equal duration defined by rising and falling edges each synchronized with a rising edge of the modulation waveform;

(c.) producing first and second half cycle waveforms indicating when the phase voltages are in the first or second half-cycles;

(d.) combining the 50% duty cycle waveform with the modulation waveform and the half cycle waveforms to derive first and second switch control signals associated with the first and second phase voltages, respectively, each of the switch control signals comprising a series of pulses wherein each pulse begins at the rising edge of a pulse of the modulation waveform and ends at the falling edge of the next pulse in the modulation waveform when the associated phase voltage is in the first half cycle and wherein each pulse begins at the falling edge of a pulse of the modulation waveform and ends at the rising edge of the next pulse in the modulation waveform when the associated phase voltage is in the second half cycle; and (e.) operating first and second switches of the inverter in accordance with the first and second switch control signals to produce the first and second phase voltages.

3. The method of claim 2, wherein the step (b.) includes the step of providing the modulation waveform to a T flip-flop having an output at which the 50% duty cycle waveform is produced.

4. The method of claim 3, including the further steps of clocking the T flip-flop using a clock signal to produce a first clocked output, providing the modulation waveform to a D flip-flop and clocking the D flip-flop using the clock signal to produce a second clocked output and wherein the step (d.) includes the step of providing the first and second clocked outputs and the half cycle waveform to a logic circuit which produces the switch control signals.

5. The method of claim 4, wherein the step (d.) includes the steps of providing the half cycle waveforms, the modulation waveform and the 50% duty cycle waveform to a series of AND gates having outputs coupled to OR gates which develop the switch control signals.

6. A control for an inverter which includes three sets of switches which are operated to produce first, second and third AC phase voltages across a three-phase load wherein each phase voltage comprises alternating positive and negative polarity half-cycles and wherein the phase voltages are angularly displaced relative to one another comprising:

first means for producing a modulation waveform comprising a series of pulses defined by alternating rising and falling edges;

second means for producing a 50% duty cycle waveform having alternating pulses and notches of substantially equal duration defined by rising and falling edges wherein each edge is substantially coincident with a rising edge of the modulation waveform;

third means for producing first, second and third half cycle waveforms indicating when the phase voltages are in the positive or negative half-cycles;

means coupled to the first through third producing means for combining the 50% duty cycle waveform with the modulation waveform and the half cycle waveforms to derive first, second and third switch control signals associated with the first, second and third phase voltages, respectively, each of the switch control signals comprising a series of pulses wherein each pulse is defined by a rising edge substantially coincident with the rising edge of a pulse of the modulation waveform and a falling edge substantially coincident with the falling edge of the next pulse in the modulation waveform when the associated phase voltage is in the positive half cycle and wherein each pulse is defined by a rising edge substantially coincident with the falling edge of a pulse of the modulation waveform and a falling edge substantially coincident with the rising edge of the next pulse in the modulation waveform when the associated phase voltage is in the negative half cycle; and means responsive to the combining means for operating the three sets of switches in accordance with the first through third switch control signals to produce the first through third phase voltages.

7. The control of claim 6, further including a processor which develops a modulation index signal representing the magnitude of the phase voltages to be applied to the load and wherein the first producing means comprises a timer/counter coupled to the processor and responsive to the modulation index signal and a first clock signal.

8. The control of claim 7, wherein the first and second producing means comprise a T flip-flop and a D flip-flop, respectively, coupled between the processor and the combining means wherein the flip-flops are both clocked by a second clock signal.

9. The control of claim 8, wherein the combining means comprises a series of AND gates having inputs coupled to the flip-flops and to the third producing means and a series of OR gates coupled to outputs of the AND gates wherein the OR gates include three outputs at which the switch control signals are produced.

* * * * *